United States Patent [19]

Hata et al.

[11] 4,340,716
[45] Jul. 20, 1982

[54] COATING COMPOSITION

[75] Inventors: Naoaki Hata, Tokyo; Hidehiko Kojo, Koshigaya; Koji Akimoto, Tokyo, all of Japan

[73] Assignee: Asahi Denka Kogyo K.K., Tokyo, Japan

[21] Appl. No.: 276,114

[22] Filed: Jun. 22, 1981

[30] Foreign Application Priority Data

Jun. 23, 1980 [JP] Japan .................................. 55/84994

[51] Int. Cl.$^3$ ............................................. C08G 59/62
[52] U.S. Cl. ..................................... 528/100; 528/87; 528/98; 528/99; 528/104; 528/106; 528/27; 525/384; 525/507
[58] Field of Search .................... 528/87, 98, 100, 104, 528/106, 99, 27; 525/384, 507

[56] References Cited

U.S. PATENT DOCUMENTS 2,167,073 7/1939 Herstein ........................... 528/100 X
4,130,549 12/1978 Veno et al. ...................... 528/100 X

*Primary Examiner*—Earl A. Nielsen
*Attorney, Agent, or Firm*—Blanchard, Flynn, Thiel, Boutell & Tanis

[57] ABSTRACT

A coating composition containing as essential components
   (A) a prepolymer of epoxy resin and polyhydroxy phenolic compound selected from the group consisting of:
      (i) poly-nuclear polyhydroxy phenols having adjacent hydroxy groups,
      (ii) polyol esters of polyhydroxy phenolic carboxylic acids having adjacent hydroxy groups,
      (iii) a mixture thereof, and
   (B) an organic hardener for epoxy resins.

This coating composition can be coated on rusty metal surfaces.

8 Claims, No Drawings

COATING COMPOSITION

BACKGROUND OF THE INVENTION

1. Field of the Invention

The present invention relates to a coating composition and more particularly, a superior anticorrosive coating composition for metals containing an epoxy resin.

2. Description of the Prior Art

A coating composition containing epoxy resin is known as an anticorrosive coating composition for metal. However, in order to show and keep good anticorrosive properties, it is necessary to remove the rust and to make sufficient treatment of the metal surface, before the application of the coating, up to the grade of St(or Sa) 2.5 of Swedish Standard SIS 05 59 00. If the metal surface is treated insufficiently, the coating shows less adherence and poorer anticorrosive properties.

In the Japanese patent gazette 49-4811, an epoxy resin composition containing a major part of common epoxy resin and a minor part of a modified epoxy resin modified by mononucleic phenolic carboxylic acid or its lower alkyl ester is disclosed. This epoxy resin composition can be used as an anticorrosive coating. However, this coating cannot be applied on a rusty surface.

It was desired to obtain a good coating composition showing good adherence and good anticorrosive properties when it was coated on a poorly treated metal surface or even on a rusty surface such as the grade of Sa 1 to Sa 1.5 of Swedish Standard SIS 05 59 00.

SUMMARY OF THE INVENTION

Accordingly, an object of the present invention is to provide a good coating composition showing good adherence and good anticorrosive properties when coated on a poorly treated metal surface or even on a rusty surface of SIS Sa 1 to 1.5. The coating composition of the present invention contains as essential components;
  (A) a prepolymer of epoxy resin and polyhydroxy phenolic compound selected from the group consisting of:
    (i) polynuclear polyhydroxy phenols having adjacent hydroxy groups,
    (ii) polyol esters of polyhydroxy phenolic carboxylic acid having adjacent hydroxy groups and,
    (iii) a mixture of (i) and (ii); and
  (B) an organic hardener for epoxy resins.

The prepolymer which is the essential component of the coating composition of the present invention is obtained by the reaction under heating of epoxy resin (I) and polynuclear polyhydroxy phenols having adjacent hydroxy groups (II-1) and/or polyol esters of polyhydroxy phenolic carboxylic acids having adjacent hydroxy groups (II-2), optionally in the presence of a solvent and/or a catalyst in such a ratio that epoxide groups remain in the prepolymer.

While the reaction temperature is not limited, it is lower than the decomposition temperature of the epoxy resin and it is high enough to finish the reaction within a proper time. Usually, the reaction proceeds at 100°-200° C.

When a catalyst is used, tertiary amines, ammonium salts, phosphonium salts, amine hydrochloride salts etc. can be used.

DETAILED DESCRIPTION OF THE INVENTION

The epoxy resins (I) which can be used in this invention include, for example, an epoxy compound which contains on the average more than one 1,2-epoxy group (preferably an epoxy compound which contains on the average 2 or more groups), epoxidized polyunsaturated compounds and other well known epoxy compounds which contain an adjacent epoxy group.

The epoxy resin (I) which may be used in the compositions of this invention include, for example, epoxy compounds (I-1) containing on the average more than one substituted glycidyl ether group which is represented by the general formula:

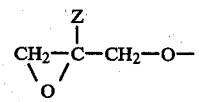

(wherein Z represents a hydrogen atom, a methyl group or an ethyl group) per molecule; epoxy compounds (I-2) containing on the average more than one substituted or nonsubstituted glycidyl ester group which is represented by the general formula:

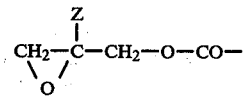

(wherein Z represents a hydrogen atom, a methyl group or an ethyl group) per molecule; and epoxy compounds (I-3) containing on the average more than one substituted or nonsubstituted N-substituted glycidyl group which is represented by the general formula:

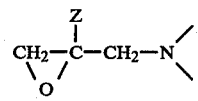

(wherein Z represents a hydrogen atom, a methyl group or an ethyl group) per molecule.

Said epoxy compounds (I-1) containing on the average more than one substituted or non-substituted glycidyl ether group per molecule may be prepared by glycidyletherifying hydroxy compounds such as phenolic hydroxyl compounds or alcoholic hydroxyl compounds.

Examples of the preferable epoxy compounds (I-1) include, for example, polyglycidyl ethers (I-1-1) of polyhydric phenols containing one or more aromatic nuclei, polyglycidyl ethers (I-1-2) of alcoholic polyhydroxyl compounds derived by the addition reaction of polyhydric phenols containing one or more aromatic nuclei with alkylene oxides containing 2 to 4 carbon atoms, and polyglycidyl ethers (I-1-3) of alcoholic polyhydroxyl compounds containing one or more alicyclic rings.

Said polyhydric phenol polyglycidyl ethers (I-1-1) include, for example, epoxide compounds containing, as the main reaction product, (1) polyglycidyl ethers obtained by reacting polyhydric phenols (D) containing at least one aromatic nucleus with epihalohydrins (e) in the presence of basic catalysts or basic compounds, such as sodium hydroxide, (2) epoxide compounds obtained by reacting polyhalohydrin ethers, obtained by reacting polyhydric phenols (D) containing at least one aromatic nucleus with epihalohydrins (e) in the presence of catalytic amounts of acid catalysts such as boron trifluoride, with basic compounds such as sodium hydroxide, and (3) epoxide compounds obtained by reacting polyhalohydrin ethers, obtained by reacting polyhydric phenols (D) containing at least one aromatic nucleus with epihalohydrins (e) in the presence of catalytic amounts of basic catalysts such as triethyl amine, with basic compounds such as sodium hydroxide.

Such polyoxyalkylated polyhydric phenol polyglycidyl ethers (I-1-2) include, for example, epoxide compounds containing, as the main reaction product, polyglycidyl ethers obtained by reacting polyhalohydrin ethers, obtained by reacting polyoxyalkylated polyhydric phenols (E) derived by the addition reaction of polyhydric phenols containing at least one aromatic nucleus with alkylene oxides containing 2 to 4 carbon atoms, with epihalohydrins (e) in the presence of a catalytic amount of acid catalyst such as boron trifluoride, with basic compounds such as sodium hydroxide.

Said polyhydric phenols containing at least one aromatic nucleus (D) include polyhydric mononuclear phenols containing one aromatic nucleus (D-1), and polyhydric polynuclear phenols containing at least two aromatic nuclei (D-2).

Illustrative polyhydric mononuclear phenols (D-1) include, for example, resorcinol, hydroquinone, pyrocatechol, phloroglucinol, 1,5-dihydroxy naphthalene, 2,7-dihydroxy naphthalene, 2,6-dihydroxy naphthalene and the like.

Illustrative polyhydric polynuclear phenols (D-2) include dihydric polynuclear phenols having the following general formula (1);

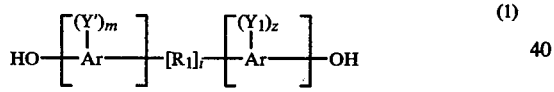

wherein: Ar is an aromatic divalent hydrocarbon group or radical such as naphthylene and phenylene, with phenylene being preferred for purposes of this invention: Y' and $Y_1$, which can be the same or different, are alkyl groups such as methyl, n-propyl, n-butyl, n-hexyl, n-octyl and the like, preferably alkyl groups having a maximum of 4 carbon atoms, or halogen atoms, i.e., chlorine, bromine, iodine, or fluorine, or alkoxy groups such as methoxy, methoxymethyl, ethoxy, ethoxyethyl, n-butoxy, amyloxy and the like, preferably an alkoxy group having a maximum of 4 carbon atoms (it is to be understood that whenever there are substituents exclusive of the hydroxyl groups on either or both of the aromatic divalent hydrocarbon groups, that these substituents can be the same or different); i is an integer having a value of 0 or 1; m and z are integers having a value of from 0 to a maximum value corresponding to the number of hydrogen atoms on the aromatic ring (Ar) which can be replaced by substituents and can have the same or different values; and $R_1$ is a divalent group or radical, as for example

or —O—, or —S—, or —SO—, or —SO$_2$—, or a divalent hydrocarbon group as, for example, an alkylene group such as methylene, ethylene, trimethylene, tetramethylene, pentamethylene, hexamethylene, 2-ethyl hexamethylene, octamethylene, nonamethylene, decamethylene, and the like, an alkylidene group such as ethylidene, propylidene, isopropylidene, isobutylidene, amylidene, isoamylidene, 1-phenyl ethylidene and the like, or a cycloaliphatic group, such as 1,4-cyclohexylene, 1,3-cyclohexylene, cyclohexylidene and the like, or halogenated alkylidene, alkylene or cycloaliphatic groups, alkoxy and aryloxy substituted alkylidene, alkylene or cycloaliphatic groups, such as methoxy methylene, ethoxy methylene, ethoxy ethylene, 2-ethoxy trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene groups, such as phenyl ethylene, 2-phenyl trimethylene, 1-phenyl pentamethylene, 2-phenyl decamethylene, and the like, aromatic groups, such as phenylene, naphthylene, and the like, halogenated aromatic groups, such as 1,4-(2-chlorophenylene), 1,4-(2-bromophenylene), 1,4-(2-fluorophenylene), and the like; alkoxy and aryloxy substituted aromatic groups, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic groups, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like, or $R_1$ can be a ring which is fused to one of the Ar groups as is the case, for example, in the compound having the formula:

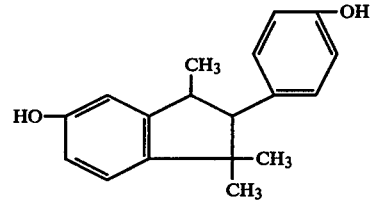

or $R_1$ can be a polyalkoxy group such as polyethoxy, polypropoxy, polythioethoxy, polybutoxy, polyphenylethoxy, or $R_1$ can be a group containing a silicon atom as, for example, polydimethylsiloxy, polydiphenylsiloxy, polymethylphenylsiloxy and the like, or $R_1$ can be two or more alkylene or alkylidene groups separated by an aromatic ring, a tertiary amino group, an ether linkage, a carbonyl group or separated by a linkage containing sulfur such as sulfur, sulfoxide and the like.

Particularly preferred as the dihydric polynuclear phenols are compounds having the general formula:

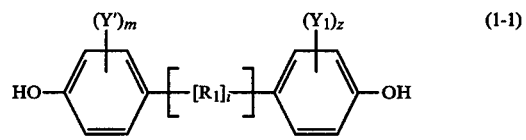

wherein Y', $Y_1$ and i are as previously defined, m and z have values of from 0 to 4 inclusive and $R_1$ is an alkylene or alkylidene group, preferably having from 1 to 3 carbon atoms inclusive, or $R_1$ is a phenylene group having the formula:

or R₁ is a saturated group having the formula:

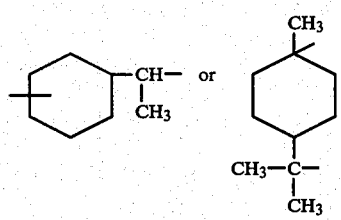

Examples of specific dihydric phenols include among others the bis-(hydroxyphenyl)-alkanes such as 2,2-bis-(p-hydroxyphenyl)-propane, commonly referred to as bisphenol-A, 2,4'-dihydroxy diphenylmethane, bis-(2-hydroxyphenyl)methane, bis-(4-hydroxyphenyl)-methane, bis-(4-hydroxy-2,6-dimethyl-3-methoxyphenyl)-methane, 1,1-bis-(4-hydroxyphenyl)ethane, 1,2-bis-(4-hydroxyphenyl)-ethane, 1,1-bis-(4-hydroxy-2-chlorophenyl)-ethane, 1,1-bis-(3,5-dimethyl-4-hydroxyphenyl)ethane, 1,3-bis-(3-methyl-4-hydroxyphenyl)-propane, 2,2-bis-(3-phenyl-4-hydroxyphenyl)-propane, 2,2-bis-(3-isopropyl-4-hydroxyphenyl)-propane, 2,2-bis-(2-isopropyl-4-hydroxyphenyl)propane, 2,2-bis-(4-hydroxynaphthyl)-propane, 2,2-bis-(4-hydroxyphenyl)-pentane, 3,3-bis-(4-hydroxyphenyl)-pentane, 3,3-bis-(4-hydroxyphenyl)-heptane, bis-(4-hydroxyphenyl)-phenylmethane, bis-(4-hydroxyphenyl)-cyclohexylmethane, 1,2-bis-(4-hydroxyphenyl)-1,2-bis-(phenyl)-propane, 2,2-bis-(4-hydroxyphenyl)-1-phenylpropane and the like; dihydroxybiphenyls such as 4,4-dihydroxybiphenyl, 2,2'-dihydroxybiphenyl, 2,4-dihydroxybiphenyl and the like; di(hydroxyphenyl)-sulfones such as bis-(4-hydroxyphenyl)-sulfone, 2,4'-dihydroxydiphenyl sulfone, 5'-chloro-2,4'-di-hydroxydiphenyl sulfone, 5'-chloro-4,4'-dihydroxydiphenyl sulfone, 3'-chloro-4,4'-dihydroxy diphenyl sulfone and the like; di(hydroxyphenyl)-ethers such as bis-(4-hydroxyphenyl)ether, the 4,3'-, 4,2'-, 2,2'-, 2,3'-, di-hydroxydiphenyl ethers, 4,4'-dihydroxy-2,6-dimethyldiphenyl ether, bis-(4-hydroxy-3-isobutylphenyl)-ether, bis-(4-hydroxy-3-isopropylphenyl)-ether, bis-(4-hydroxy-3-chlorophenyl)-ether, bis-(4-hydroxy-3-fluorophenyl)-ether, bis-(4-hydroxy-3-bromophenyl)-ether, bis-(4-hydroxynaphthyl)-ether, bis-(4-hydroxy-3-chloronaphthyl)-ether, bis-(2-hydroxybiphenyl)-ether, 4,4'-dihydroxy-2,6-dimethoxydiphenyl ether, 4,4'-dihydroxy-2,5-diethoxydiphenyl ether, and the like; also suitable are 1,1-bis-(4-hydroxyphenyl)-2-phenylethane, 1,3,3'-trimethyl-1-(4-hydroxyphenyl)-6-hydroxyindane, 2,4-bis-(p-hydroxyphenyl)-4-methylpentane and the like.

Other examples of dihydric dinuclear phenols are biphenols such as 4,4'-dihydroxy biphenyl, 3-methyl-4,4'-dihydroxy biphenyl, octachloro-4,4'-dihydroxy biphenyl and the like.

Also preferred are other dihydric polynuclear phenols having the general formula:

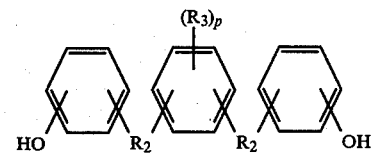

wherein R₃ is a methyl or ethyl group, R₂ is an alkylidene or other alkylene having from 1 to 9 carbon atoms, and p ranges from zero to 4. Examples of dihydric polynuclear phenols having the formula (1-2) include 1,4-bis-(4-hydroxybenzyl)-benzene, 1,4-bis-(4-hydroxybenzyl)tetramethylbenzene, 1,4-bis-(4-hydroxybenzyl)-tetraethylbenzene, 1,4-bis(p-hydroxycumyl)-benzene, 1,3-bis(p-hydroxycumyl)-benzene and like.

Other examples of polyhydric polynuclear phenols (D-2) include, for example, pre-condensation products of phenols with carbonyl compounds, (for example, pre-condensation products of phenol resin, condensation products of phenols with acroleins, condensation products of phenols with glyoxal, condensation products of phenols with pentanediol, condensation products of resorcinols with acetone, and pre-condensation products of xylenes-phenols with formalin), and condensation products of phenols with polychloromethylated aromatic compounds (for example, condensation products of phenols with bischloromethylxylene).

The polyoxyalkylated polyhydric phenols (E) are compounds which are obtained by reacting the above-mentioned polyhydric phenols (D) having at least one aromatic nucleus with an alkylene oxide in the presence of such catalysts as will accelerate the reaction of the OH group and the epoxy group and which has atomic groups of —ROH (wherein R is an alkylene group derived from an alkylene oxide) and/or —(RO)ₙH (wherein R is an alkylene group derived from an alkylene oxide, one polyoxyalkylene chain may contain different alkylene groups and n is an integer of 2 or more indicating the number of polymerized oxyalkylene groups) bonded with said phenol residue by an ether bond. In this case, the ratio of alkylene oxide to said polyhydric phenol (D) is made more than 1:1 (mol:mol). But, preferably, the ratio of the alkylene oxide to the OH group of said polyhydric phenol (D) is 1 to 10:1 or particularly 1 to 3:1 by equivalents.

Said alkylene oxides include, for example, ethylene oxide, propylene oxide and butylene oxide, and particularly preferred are those which will bring forth branched chains in the case of producing ether linkages by their reaction with polyhydric phenols. Preferable examples thereof include propylene oxide and 2,3-butylene oxide, and a particularly preferable example thereof is propylene oxide.

Particularly preferred among the polyoxyalkylated polyhydric phenols (E) are those having the following general formula:

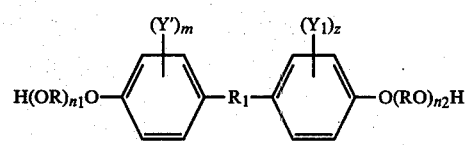

wherein Y', Y₁, m, z and R₁ have the same significance as defined for the general formula (1-1), R is an alkylene group containing 2 to 4 carbon atoms, and $n_1$ and $n_2$ range from 1 to 3.

In addition, preferred among the polyoxyalkylated polyhydric phenols (E) are those having the following general formula:

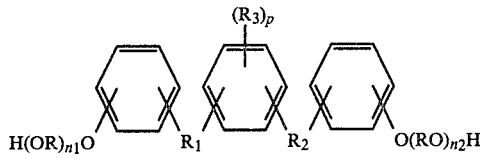

wherein $R_1$, $R_2$ $R_3$, and p have the same significance as defined for the general formulas (1-1) and (1-2), R is an alkylene group containing 2 to 4 carbon atoms, and $n_1$ and $n_2$ range from 1 to 3.

Further, as epoxy compounds (I-2) having an average of more than one substituted or nonsubstituted glycidyl ester group in the molecule, there are polyglycidyl esters of aliphatic polycarboxylic acids or aromatic polycarboxylic acids. For example, there is included an epoxy resin such as is obtained by polymerizing glycidyl methacrylate synthesized from an epihalohydrin (e) represented by the below-mentioned general formula (4) and methacrylic acid.

Further, as examples of epoxy compounds (I-3) having an average of more than one substituted or nonsubstituted N-substituted glycidyl group in the molecule, there can be enumerated epoxy resins obtained from aromatic amines (for example, aniline or aniline having alkyl substituent(s) in the nucleus) and epihalohydrins (e) represented by the below-mentioned general formula (4) and epoxy resins obtained from precondensates of aromatic amines and aldehydes (for example, aniline-formaldehyde precondensates or aniline-phenol-formaldehyde precondensates) and epihalohydrins (e).

Said polyhydric alicyclic alcohol polyglycidyl ethers (I-1-3) include, for example, epoxide compounds containing, as the main reaction product, polyglycidyl ethers obtained by reacting polyhydric alcohols (F) containing at least one alicyclic ring with epihalohydrins (e) in the presence of basic catalysts or basic compounds, such as sodium hydroxide, epoxide compounds obtained by reacting polyhalohydrin ethers, obtained by reacting polyhydric alcohols (F) containing at least one alicyclic ring with epihalohydrins (e) in the presence of catalytic amounts of acid catalysts such as boron trifluoride, with basic compounds such as sodium hydroxide, and epoxide compounds obtained by reacting polyhalohydrin ethers, obtained by reacting polyhydric alcohols (F) containing at least one alicyclic ring with epihalohydrins (e) in the presence of catalytic amounts of basic catalysts such as triethyl amine, with basic compounds such as sodium hydroxide.

Similarly such polyglycidyl ethers (I-1-3) include, for example, epoxide compounds containing, as the main reaction product, polyglycidyl ethers obtained by reacting polyhalohydrin ethers, obtained by reacting polyhydroxyl compounds (G) derived by the addition reaction of polyhydric alcohols (F) containing at least one alicyclic ring with alkylene oxides containing 2 to 4 carbon atoms, with epihalohydrins (e) in the presence of catalytic amounts of acid catalysts such as boron trifluoride, with basic compounds such as sodium hydroxide.

Preferred examples of polyglycidyl ether (I-1-3) are polyglycidyl ethers derived from polyhydric alcohols containing at least one alicyclic ring and polyglycidyl ethers derived by an addition reaction of polyhydric alcohols containing at least one alicyclic ring with an alkylene oxide containing 2 to 4 carbon atoms.

Said polyglycidyl ethers (I-1-3) can be prepared by the hydrogenation of aromatic rings of epoxide resins derived from polyhydric phenols containing at least one aromatic ring, such as polyglycidylethers of polyhydric phenols, to alicyclic rings, in which reaction usable catalysts are, for example, rhodium or ruthenium supported on a carrier, which are described in Japanese Patent Publication 42-7788 (7788/1967).

Said polyhydric alcohols containing at least one alicyclic ring (F) include polyhydric mononuclear alcohols containing one alicyclic ring (F-1), and polyhydric polynuclear alcohols containing at least two alicyclic rings (F-2).

Preferable polyhydric mononuclear alcohols (F-1) include dihydric mononuclear alcohols having the following formula (2):

$$HO—(R_4)_f—A—(R_5)_g—OH \qquad (2)$$

wherein A represents a divalent cyclohexyl group which may be substituted by alkyl groups, such as methyl, n-propyl, n-butyl, n-hexyl, n-octyl and the like, preferably alkyl groups having a maximum of 4 carbon atoms, or halogen atom, i.e., chlorine, bromine, or fluorine, or alkoxy groups such as methoxy, methoxymethyl, ethoxy, ethoxyethyl, n-butoxy, amyloxy and the like, preferably an alkoxy group having a maximum of 4 carbon atoms, preferably nonsubstituted or substituted with halogen atoms, in view of properties of flame-resistance. $R_4$ and $R_5$, which can be the same or different, are alkylene groups such as methylene, n-propylene, n-butylene, n-hexylene, n-octylene and the like, preferably alkylene groups having a maximum of 6 carbon atoms; f and g, which can be the same or different, are 0 or 1, preferably 0.

Illustrative dihydric monocyclic alcohols having one cyclohexyl ring are, for example, substituted or nonsubstituted cyclohexanediols such as 1,4-cyclohexanediol, 2-methyl-1,4-cyclohexanediol, 2-chloro-1,4-cyclohexanediol, 1,3-cyclohexanediol, and the like, substituted or non-substituted dihydroxyalkyl-cyclohexane such as 1,4-dihydroxymethylcyclohexane, 1,4-dihydroxyethylcyclohexane, 1,3-dihydroxyethylcyclohexane, 1,4-dihydroxypropylcyclohexane, 1,4-dihydroxybutylcyclohexane and the like.

Further, polyhydric mononuclear alcohols having one alicyclic ring, except a cyclohexyl ring, can be substituted or nonsubstituted cycloalkylpolyols, such as 1,3-cyclopentanediol, 1,4-cycloheptanediol, 1,3-cycloheptanediol, 1,5-perhydronaphthalenediol, 1,3-dihydroxy-2,2,4,4-tetramethylcyclobutane, 2,6-dihydroxydecahydronaphthalene, 2,7-dihydroxydecahydronaphthalene, 1,5-dihydroxydecahydronaphthalene and the like, and substituted or nonsubstituted polyhydroxyalkyl cycloalkanes such as 1,3-dihydroxymethylcyclopentane, 1,4-dihydroxymethylcycloheptane, 2,6-bis(hydroxymethyl)decahydronaphthalene, 2,7-bis(hydroxymethyl)-decahydronaphthalene, 1,5-bis(hydroxymethyl)-decahydronaphthalene, 1,4-bis(hydroxymethyl)-decahydronaphthalene, 1,4-bis(hydromethyl)-bicyclo[2,2,2]-octane and dimethyloltricyclodecane.

Particularly preferred, by reason of economy, as the polyhydric monocyclic alcohol is 1,4-dihydroxymethylcyclohexane.

Further, polyhydric polycyclic alcohols (F-2), for example, include polyhydric polycyclic alcohols having the following general formula (3):

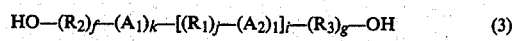
$$HO-(R_2)_f-(A_1)_k-[(R_1)_j-(A_2)_i]_i-(R_3)_g-OH \qquad (3)$$

wherein: $A_1$ and $A_2$ are mono-ring or poly-ring divalent alicyclic hydrocarbon groups which may be substituted by alkyl groups, such as methyl, n-propyl, n-butyl, n-hexyl, n-octyl and the like (preferably alkyl groups having a maximum of 4 carbon atoms), or halogen atoms, i.e., chlorine, bromine, or fluorine, or alkoxy groups such as methoxy, methoxymethyl, ethoxy, ethoxyethyl, n-butoxy, amyloxy and the like (preferably alkoxy groups having a maximum of 4 carbon atoms), or may be unsubstituted, preferably, $A_1$ and $A_2$ are nonsubstituted or substituted by halogen atoms in view of properties of flame-resistance; k and l are 0 or 1, except that k and l are 0 together; $R_1$ has the same significance as defined for the general formula (1), preferably methylene group, ethylene group or isopropylene group in view of properties of flame-resistance: j is 0 or 1; $R_2$ and $R_3$, which can be the same or different, are alkyl groups such as methyl, n-propyl, n-butyl, n-hexyl, n-octyl and the like, preferably alkyl groups having a maximum of 6 carbon atoms; f and g are 0 or 1, preferably 0, and i is an integer 0 or more than 0, preferably 0 or 1.

Particularly preferable polyhydric polycyclic alcohols (F-2) are dihydric polycyclic alcohols having the following general formula (3-1):

$$HO-A_1-(R_1)_j-A_2-OH \qquad (3-1)$$

wherein: $A_1$, $A_2$, $R_1$ and j have the same significance as defined for the general formula (3).

Preferable examples of such dihydric polycyclic alcohols are substituted or nonsubstituted bicyclo alkanediols such as 4,4'-bicyclohexanediol, 3,3'-bicyclohexanediol, octachloro-4,4'-bicyclohexanediol and the like, or bis-(hydroxycycloalkyl)-alkanes such as 2,2-bis-(4-hydroxycyclohexyl)-propane, 2,4'-dihydroxydicyclohexylmethane, bis-(2-hydroxycyclohexyl)methane, bis-(4-hydroxycyclohexyl)-methane, bis-(4-hydroxy-2,6-dimethyl-3-methoxycyclohexyl)-methane, 1,1-bis-(4-hydroxycyclohexyl)-ethane, 1,1-bis-(4-hydroxycyclohexyl)-propane, 1,1-bis-(4-hydroxycyclohexyl)-butane, 1,1-bis-(4-hydroxycyclohexyl)-pentane, 2,2-bis-(4-hydroxycyclohexyl)-butane, 2,2-bis-(4-hydroxycyclohexyl)-pentane, 3,3-bis-(4-hydroxycyclohexyl)-pentane, 2,2-bis-(4-hydroxycyclohexyl)-heptane, bis-(4-hydroxycyclohexyl)-phenylmethane, bis-(4,4-hydroxycyclohexyl)-cyclohexylmethane, 1,2-bis-(4-hydroxycyclohexyl)-1,2-bis-(phenyl)-propane, 2,2-bis-(4-hydroxycyclohexyl)-1-phenylpropane, 2,2-bis-(4-hydroxy-3-methylcyclohexyl)propane, 2,2-bis-(4-hydroxy-2-methyl-cyclohexyl)-propane, 1,2-bis-(4-hydroxycyclohexyl)ethane, 1,1-bis-(4-hydroxy-2-chloro-cyclohexyl)ethane, 1,1-bis-(3,5-dimethyl-4-hydroxycyclohexyl)ethane, 1,3-bis-(3-methyl-4-hydroxycyclohexyl)propane, 2,2-bis-(3,5-dichloro-4-hydroxycyclohexyl)propane, 2,2-bis-(3-phenyl-4-hydroxycyclohexyl)propane, 2,2-bis-(3-isopropyl-4-hydroxycyclohexyl)-propane, 2,2-bis-(2-isopropyl-4-hydroxycyclohexyl)propane, 2,2-bis-(4-hydroxyperhydronaphthyl)propane, and the like, dihydroxycycloalkanes such as 4,4'-dihydroxydicyclohexane, 2,2-dihydroxybicyclohexane, 2,4-dihydroxybicyclohexane, and the like, di-(hydrocycloalkyl)-sulfones such as bis-(4-hydroxycyclohexyl)-sulfone, 2,4'-dihydroxy-dicyclohexylsulfone, 5-chloro-2,4-dihydroxydicyclohexylsulfone, 5-chloro-4,4'-dihydroxydicyclohexylsulfone, 3'-chloro-4,4'-dihydrocyclohexylsulfone and the like, di-(hydroxycycloalkyl)ether such as bis-(4-hydroxycyclohexyl)ether, 4,3'-(or 4,2'-, 2,2'- or 2,3'-)dihydroxydicyclohexylether, 4,4'-dihydroxy-2,6-dimethyldicyclohexylether, bis-(4-hydroxy-3-isobutylcyclohexyl)ether, bis-(4-hydroxy-3-isopropylcyclohexyl)ether, bis-(4-hydro-3-chlorocyclohexyl)ether, bis-(4-hydroxy-3-fluorocyclohexyl)ether, bis-(4-hydroxy-3-bromocyclohexyl)ether, bis-(4-hydroxy-perhydronaphthyl)ether, bis-(4-hydroxy-3-chloro-perhydronaphthyl)ether, bis-(2-hydroxybicyclohexyl)ether, 4,4'-dihydroxy-2,6-dimethoxydicyclohexylether, 4,4'-dihydroxy-2,5-diethoxydicyclohexylether, and the like, 1,1-bis-(4-hydroxycyclohexyl)-2-phenyethane, 1,3,3-trimethyl-1-(4-hydroxycyclohexyl)-6-hydroxyindane, 2,4-bis-(p-hydroxycyclohexyl)-4-methylpentane.

A preferable group of such dihydric polycyclic alcohols are compounds having the following general formula (3-2):

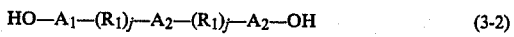
$$HO-A_1-(R_1)_j-A_2-(R_1)_j-A_2-OH \qquad (3-2)$$

wherein: $A_1$, $A_2$, $R_1$ and j have the same significance as defined for the general formula (3) and two $R_1$, two j and two $A_2$ are the same or different each other.

Examples of such dihydric polycyclic alcohols are 1,4-bis(4-hydroxycyclohexylmethyl)-cyclohexane, 1,4-bis(4-hydroxy-cyclohexylmethyl)-tetramethylcyclohexane, 1,4-bis(4-hydroxycyclohexylmethyl)-tetraethylcyclohexane, 1,4-bis(p-hydroxycyclohexyl-isopropyl)-cyclohexane, 1,3-bis(p-hydroxycyclohexyl-isopropyl)-cyclohexane and the like.

Another preferable group of such dihydric polycyclic alcohols are the compounds having the following general formula (3—3):

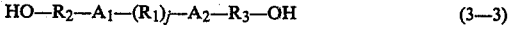
$$HO-R_2-A_1-(R_1)_j-A_2-R_3-OH \qquad (3-3)$$

wherein: $A_1$, $A_2$, $R_1$, $R_2$, $R_3$, j have the same significance as defined for the general formula (3).

Examples of such dihydric polycyclic alcohols are substituted or nonsubstituted dihydroxyalkylbicycloalkanes, such as 4,4'-dihydroxymethylbicyclohexane, and substituted or unsubstituted bis(hydroxyalkylcycloalkyl)alkanes, such as 1,2-bis(4-hydroxymethylcyclohexyl)-ethane, 2,2-bis(4-hydroxymethylcyclohexyl)-propane, 2,3-bis(4-hydroxymethylcyclohexyl)butane, 2,3-dimethyl-2,3-bis-(4-hydroxymethylcyclohexyl)butane and the like.

The polyhydroxyl compound (G) here is a compound which is obtained by reacting the above-mentioned polyhydric alcohols (F) having at least one alicyclic ring with an alkylene oxide in the presence of such catalysts as will accelerate the reaction of the OH group and the epoxy group and which has atomic groups —ROH (wherein R is an alkylene group derived from an alkylene oxide) and/or —(RO)$_n$H (wherein R is an alkylene group derived from an alkylene oxide, such that one polyoxyalkylene chain may contain different alkylene groups, and n is an integer of 2 or more showing the polymerized number of oxyalkylene groups) bonded with said phenol residue by an ether bond. In this case, the ratio of alkylene oxide to said polyhydric alcohols (F) is made more than 1:1 (mol:mol). But, preferably, the ratio of the alkylene oxide to the OH group of said polyhydric alcohol (F) is 1 to 10:1 or particularly 1 to 3:1 by equivalents. Said alkylene oxides include, for example, ethylene oxide, propylene oxide and butylene oxide, and particularly preferred are those which will bring forth branched chains when producing ether linkages by their reaction with polyhydric phenols. Preferable examples thereof include propylene oxide and 2,3-butylene oxide, and a particularly preferable example thereof is propylene oxide.

A particularly preferable group among the polyhydroxyl compounds (G) is the compounds having the following general formula:

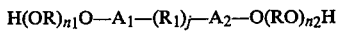

wherein $A_1$, $A_2$, $j$ and $R_1$ have the same significance as defined for the general formula (3-1), R is an alkylene group containing 2 to 4 carbon atoms, and $n_1$ and $n_2$ range from 1 to 3.

In addition, a preferable group among the polyhydroxyl compounds (G) is the compounds having the following general formula:

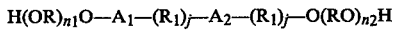

wherein $A_1$, $A_2$, $j$ and $R_1$ have the same significance as defined for the general formula (3-2), R is an alkylene group containing 2 to 4 carbon atoms, and $n_1$ and $n_2$ range from 1 to 3.

A particularly preferable group among the polyhydroxyl mono- or polynuclear alcohols (F) is alcohols having one or two cyclohexane-rings as an alicyclic ring, 2,2-bis-(4-hydroxycyclohexyl)-propane.

The epihalohydrin (e) is represented by the following general formula (4):

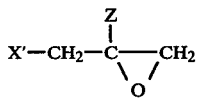

wherein Z represents a hydrogen atom, a methyl group or an ethyl group, and X' represents a halogen atom.

Examples of epihalohydrins (e) include, for example, epichlorohydrin, epibromohydrin, 1,2-epoxy-2-methyl-3-chloropropane, 1,2-epoxy-2-ethyl-3-chloropropane.

Examples of acid catalysts which can be used for accelerating the reaction of epihalohydrins (e) with polyhydric phenols (D), polyhydroxyl compounds (E), polyhydric alcohols (F) or polyhydroxyl compounds (G) include, for example, Lewis acids such as boron trifluoride, stannic chloride, zinc chloride and ferric chloride, active derivatives of Lewis acid such as boron trifluoride etherate and mixtures thereof.

Examples of basic catalysts which can be used for accelerating the reaction of epihalohydrins (e) with polyhydric phenols (D), polyhydric alcohols (F) or polyhydroxyl compounds (G) include, for example, alkali metal hydroxides such as sodium hydroxide, alkali metal alcoholates such as sodium ethylate, tertiary amines such as triethyl amine and triethanol amine, quaternary ammonium compounds such as tetramethylammonium bromide, and mixtures of them.

Examples of basic compounds which can be used for preparing glycidyl ethers at the same time as epihalohydrins (e) react with polyhydric phenols (D), polyhydric alcohols (F) or polyhydroxyl compounds (G), or for preparing glycidyl ethers by dehydrohalogenating halohydrin ethers obtained by reacting epihalohydrins (e) with polyhydric phenols (D) include, for example, alkali metal hydroxides such as sodium hydroxide, alkali metal aluminates such as sodium aluminate, and the like.

These catalysts or basic compounds can be used as they are or in the form of solutions in suitable inorganic and/or organic solvents.

The acid catalysts have a large catalytic effect among the catalysts which can be used for accelerating the reaction of epihalohydrins (e) with polyhydric phenols (D), polyhydroxyl compounds (E), polyhydric alconols (F) or polyhydroxy compounds (G).

Further, polyglycidyl ethers obtained by the reaction of epihalohydrins and a mixture of the above-mentioned polyhydric alcohols, can be used as epoxy compounds of the present invention.

Examples of epoxidized poly-unsaturated compounds (I-4), include, for example, epoxidized polybutadiene (called oxiron), vinylcyclohexenedioxide, limonenedioxide, dicyclopentadienedioxide, bis(3,4-epoxy-cyclohexylmethyl)phthalate, diethyleneglycol-bis(3,4-epoxy-cyclohexene carboxylate), 3,4-epoxy-6-methyl-cyclohexylmethyl-3,4-epoxy-6-methylcyclohexane carboxylate, 3,4-epoxy-hexahydrobenzal-3,4 nonsubstituted 1,1-dimethanol and ethyleneglycol-bis(3,4-epoxy-tetrahydrodicyclopentadien-8-yl)-ether.

Further, well known epoxy resins which contain adjacent epoxy groups, for example, various epoxy resins disclosed in various literatures, such as "Production and Use of Epoxy Resins" (edited by Hiroshi Kakiuchi), published by Shokodo, Tokyo (1970), can be used.

Among these epoxy resins (I), preferred is a glycidyl ether having an epoxy equivalent of 180–1000.

The preferred examples of the polynuclear polyhydroxy phenols having adjacent hydroxy groups (II-1) used in the present invention are the condensation products of formaldehyde and the following polyhydroxy phenols having at least one adjacent hydroxy group. The preferred examples of the polyhydroxy phenols are catechol, catechol-3-carboxylic acid or its esters, catechol-4-carboxylic acid or its esters, pyrogallol, pyrogallol-4-carboxylic acid or its esters, pyrogallol-4,6-dicarboxylic acid or its esters, gallic acid or its esters, tannic acid or its esters, and urushiol.

When the above-mentioned polyhydroxy phenols are condensed with formaldehyde, other phenols such as phenol, cresol, hydroquinone, salicyclic acid etc. may be co-condensed.

The preferred examples of the polyol esters of the polyhydroxy phenolic carboxylic acids having adjacent hydroxy groups (II-2) are aliphatic polyol esters. The preferred examples of aliphatic polyols are diols such as ethylene glycol, propylene glycol, butylene glycol, 1,6-hexanediol, diethylene glycol, dipropyleneglycol, triethylene glycol, tripropylene glycol, etc., triols such as glycerin, trimethylol propane, etc., higher polyols such as pentaerythritol, sorbitol, glucose, etc.

The preferred examples of the polyhydroxy phenolic carboxylic acids are catechol-3-carboxylic acid, catechol-4-carboxylic acid, gallic acid, m-galloyl gallic acid, pyrogallol-4-carboxylic acid, pyrogallol-4,6-dicarboxylic acid and tannic acid.

The structure of the ester of glycerin and catechol-4-carboxylic acid, as an example, is as follows:

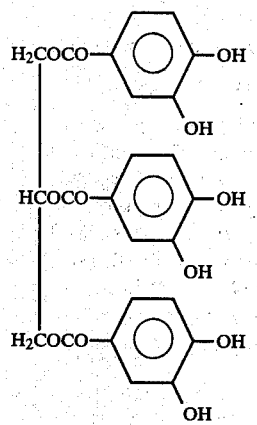

When a polycarboxylic compound is used, the esters can contain higher condensation products.

When the above-mentioned polyhydroxy phenols are condensed with polyols, other phenolic carboxylic acids such as salicyclic acid, p-hydroxy benzoic acid, etc. may be co-condensed.

The reaction ratio of the epoxy resin (I) and the polynuclear polyhydroxy phenols having adjacent hydroxy groups (II-1) and/or the polyol esters of the polyhydroxy phenolic carboxylic acids having adjacent hydroxy groups (II-2) is (I)/[II-1) and/or (II-2)]=1/0.05 to 1/0.1 (mole/mole). Preferably, the average epoxide equivalent of the modified epoxy resin is less than 3,000.

Hardeners known as hardeners for epoxy coating compositions can be used for the organic hardener for epoxy resins of the present invention. The exaples of such hardeners are aliphatic polyamines, aromatic modified polyamines, alicyclic modified polyamines, polyamides, amino resins, carboxylic acids and the like.

The ratio of the modified epoxy resin and the hardener is basically determined by the number of epoxide groups in the epoxy resin and the number of active groups with epoxide groups in the hardener. While the relationship of approximate equivalence should be kept, some allowance is permitted in the ratio. So, the ratio ranges between 0.5 to 1.5 in equivalents.

In the coating composition of the present invention, other epoxy resins, diluents, solvents, colorants, pigments, anticorrosive pigments, fillers and other additives can be contained, if necessary.

The coating composition can be cured under ambient conditions. However, it may cured under higher temperatures, if necessary.

In the following Examples the term "parts" means parts by weight.

EXAMPLE 1

100 parts of diglycidyl ether of bisphenol-A (epoxide equivalent=190), 20 parts of the condensation products of catechol and formaldehyde (molecular weight=450), 60 parts of ethyl cellosolve and 0.2 part of triethylamine are mixed and reacted at 140°-150° C. hours with agitation. Prepolymer (I) containing 65 weight% of solid content is obtained.

100 parts of prepolymer (I) and 30 parts of polyamide hardener (amine value=200) are mixed and coated on a rusty steel plate (a steel plate exposed to outdoor condition for 1 year and treated to remove swelled rust to the grade of DSal of SIS) with 150-200μ of thickness. The coating is cured for 1 week under room temperature.

The results of the tests of adhesiveness and anticorrosive properties are shown in Table 1.

EXAMPLE 2

150 parts of diglycidyl ether of bisphenol-A (epoxide equivalent=450), 15 parts of the condensation products of pyrogallol and formaldehyde (molecular weight=390), 100 parts of cyclohexanone and 0.7 parts of triethanolamine are mixed and reacted at 130°-140° C. for 15 hours with agitation. Prepolymer (II) containing 60 weight% of solid content is obtained.

100 parts of prepolymer (II) and 10 parts of polyamide hardener (amine value=260) are mixed and coated on a rusty steel plate and cured in the same manner as Example 1.

The results of the tests are shown in Table 1.

EXAMPLE 3

200 parts of diglycidyl ether of bisphenol-A (epoxide equivalent=270), 25 parts of the condensation products of ethyl-3,4-dihydroxy benzoate (ethyl ester of catechol-4-carboxylic acid) and formaldehyde (molecular weight=650) and 150 parts of cellosolve acetate are mixed and reacted at 150°-160° C. for 50 hours with agitation. Prepolymer (III) containing 60 weight% of solid content is obtained.

100 parts of prepolymer (III) and 15 parts of ADEKA HARDENER EH-551 (modified aromatic amine made by Asahi Denka Kogyo K.K., amine value=290) are mixed and coated on a rusty steel plate and cured in the same manner as Example 1.

The results of the tests are shown in Table 1.

EXAMPLE 4

150 parts of diglycidyl ether of bisphenol-A (epoxide equivalent=190), 50 parts of diglycidyl ether of propylene oxide adducts of bisphenol-A (epoxide equivalent=340), 45 parts of the condensation products of m-galloyl gallic acid methyl ester and formaldehyde (molecular weight=750), 245 parts of cellosolve acetate and 0.7 parts of triethylamine are mixed and reacted at 150°-160° C. for 15 hours with agitation. Prepolymer (IV) containing 50 weight% of solid content is obtained.

100 parts of prepolymer (IV) and 11 parts of ADEKA HARDENER EH-218 (modified aliphatic amine made by Asahi Denka Kogyo, K.K., amine value=380) are mixed and coated on a rusty steel plate and cured in the same manner as Example 1.

The results of the tests are shown in Table 1.

EXAMPLE 5

100 parts of diglycidyl ether of bisphenol-A (epoxide equivalent=190), 20 parts of triglyceride of catechol-4-carboxylic acid (molecular weight=500), 60 parts of ethyl cellosolve and 0.15 parts of dimethyl benzyl amine are mixed and reacted at 150° C. for 7 hours with agitation. Prepolymer (V) containing 67 weight% of solid content is obtained.

100 parts of prepolymer (V) and 40 parts of polyamide hardener (amine value=200) are mixed and coated on a rusty steel panel with 150μ of thickness. The coating is cured for 1 week under room temperature.

The results of the tests are shown in Table 1.

EXAMPLE 6

200 parts of diglycidyl ether of bisphenol-A (epoxide equivalent=280), 35 parts of triester of trimethylol propane and gallic acid (molecular weight=590) and 100 parts of ethyl cellosolve are mixed and reacted at 160° C. for 65 hours with agitation. Prepolymer (VI) containing 70 weight% of solid content is obtained.

100 parts of prepolymer (VI) and 10 parts of ADEKA HARDENER EH-551 are mixed and coated on a rusty steel plate and cured in the same manner as Example 5.

The results of the tests are shown in Table 1.

EXAMPLE 7

150 parts of diglycidyl ether of bisphenol-A (epoxide equivalent=190), 50 parts of diglycidyl ether of propylene oxide adducts of bisphenol-A (epoxide equivalent=340), 50 parts of the ester of glucose and m-galloyl gallic acid, 100 parts of cellosolve acetate and 0.5 parts of triethyl amine are mixed and reacted at 140° C. for 16 hours with agitation. Prepolymer (VII) containing 70 weight% of solid content is obtained.

100 parts of prepolymer (VII) and 8 parts of ADEKA HARDENER EH-200 (modified aliphatic amine made by Asahi Denka Kogyo, K.K., amine value=375) are mixed and coated on a rusty steel plate and cured in the same manner as Example 5.

The results of the tests are shown in Table 1.

EXAMPLE 8

150 parts of diglycidyl ether of bisphenol-F (epoxide equivalent=240), 50 parts of diester of diethylene glycol and pyrogallol-4-carboxylic acid, 100 parts of cyclohexanone and 1 part of triethanol amine are mixed and reacted at 135° C. for 12 hours with agitation. Prepolymer (VIII) containing 67 weight% of solid content is obtained.

100 parts of prepolymer (VIII) and 20 parts of polyamide hardener (amine value=200) are mixed and coated on a rusty steel plate and cured in the same manner as Example 5.

The results of the test are shown in Table 1.

COMPARATIVE EXAMPLE 1

100 parts of diglycidyl ether of bisphenol-A (epoxide equivalent=190, the same epoxy resin used in Examples 1, 4, 5 and 7) and 80 parts of polyamide hardener (amine value=200, the same hardener used in Examples 1, 5 and 8) are mixed and coated on a rusty steel plate and cured in the same manner as Example 1.

The results of the tests are shown in Table 1.

COMPARATIVE EXAMPLE 2

100 parts of diglycidyl ether of bisphenol-A (epoxide equivalent=450, the same epoxy resin used in Example 2) and 15 parts of ADEKA HARDENER EH-551 are mixed and coated on a rusty steel plate and cured in the same manner as Example 1.

The results of the tests are shown in Table 1.

COMPARATIVE EXAMPLE 3

75 parts of diglycidyl ether of bisphenol-A (epoxide equivalent=190), 25 parts of diglycidyl ether of propylene oxide adducts of bisphenol-A (epoxide equivalent=340, the same epoxy resin mixture used in Examples 4 and 7), and 30 parts of ADEKA HARDENER EH-220 are mixed and coated on a rusty steel plate and cured in the same manner as Example 1.

The results of the tests are shown in the Table 1.

COMPARATIVE EXAMPLE 4

Comparative Example 3 is repeated using ADEKA HARDENER EH-218 instead of ADEKA HARDENER EH-220.

The results are shown in Table 1.

COMPARATIVE EXAMPLE 5

100 parts of diglycidyl ether of bisphenol-A (epoxide equivalent=270), 15 parts of pyrogallol, 60 parts of ethyl cellosolve and triethylamine are mixed and reacted under 140°-150° C. for 6 hours with agitation. Prepolymer (IX) containing 65 weight% of solid content is obtained.

100 parts of prepolymer (IX) 15 parts of and ADEKA HARDENER EH-218 are mixed and coated on a rusty steel plate and cured in the same manner as Example 1.

The results of the tests are shown in Table 1.

COMPARATIVE EXAMPLE 6

100 parts of diglycidyl ether of bisphenol-A (epoxide equivalent=190), 30 parts of tannic acid, 30 parts of ethyl cellosolve and 25 parts of n-butanol are mixed.

100 parts of the mixture and 40 parts of polyamide hardener (amine value=160) are mixed and coated on a rusty steel plate and cured in the same manner as Example 1.

The results of the tests are shown in Table 1.

COMPARATIVE EXAMPLE 7

Mixture (A) containing 100 parts of diglycidyl ether of bisphenol-A (epoxide equivalent=450) and 54 parts of ethyl cellosolve and mixture (B) containing 15 parts of ADEKA HARDENER EH-551, 10 parts of tannic acid and 10 parts of n-butanol are mixed and coated on a rusty steel plate and cured in the same manner as Example 1.

The results of the tests are shown in Table 1.

TABLE 1

| | Example 1 | Example 2 | Example 3 | Example 4 | Example 5 | Example 6 | Example 7 | Example 8 |
|---|---|---|---|---|---|---|---|---|
| Hardness (by pencil)[1] | H | HB | H | H | F | HB | B | HB |
| Adhesiveness | | | | | | | | |
| Adhesive Tape Test[1] (No./No.) (Cross Cut) | 100/100 | 100/100 | 100/100 | 100/100 | 100/100 | 100/100 | 100/100 | 100/100 |
| Drawing Test[1] (No./No.) | 10/10 | 10/10 | 10/10 | 10/10 | 10/10 | 10/10 | 10/10 | 10/10 |
| Flexibility (6 mm Mandrel)[1] | pass | pass | pass | pass | pass | pass | pass | pass |
| Anticorrosive Property | | | | | | | | |
| Salt Spray Test[2] (5% NaCl, 1500 hours) | excellent | excellent | good | excellent | excellent | good | excellent | excellent |
| Weatherometer[1] (1000 hours) | excellent | excellent | good | excellent | excellent | good | excellent | excellent |

TABLE 1-continued

| | | | | | | | | |
|---|---|---|---|---|---|---|---|---|
| Salt Solution Resistance (dipped in 5% NaCl for 150 days) | — | — | — | — | excellent | good | excellent | excellent |

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Hardness (by pencil)[1] | HB | H | F | F | | H | H |
| Adhesiveness | | | | | | | |
| Adhesive Tape Test[1] (No./No.) (Cross Cut) | 40/100 | 30/100 | 50/100 | 50/100 | 55/100 | 40/100 | 35/100 |
| Drawing Test[1] (No./No.) | 3/10 | 3/10 | 5/10 | 4/10 | 5/10 | 4/10 | 4/10 |
| Flexibility (6 mm Mandrel)[1] | partially cracked | peeled off | partially cracked | peeled off | peeled off | peeled off | peeled off |
| Anticorrosive Property | | | | | | | |
| Salt Spray Test[2] (5% NaCl, 1500 hours) | rusty, swelled over all | rusty, swelled | rusty, swelled over all | rusty swelled over all | rusty, swelled over all | rusty, swelled over all | rusty, swelled over all |
| Weatherometer[1] (1000 hours) | spotted rust and swelled | spotted rust and swelled | spotted rust and welled | spotted rust and swelled | spotted rust and swelled | spotted rust and swelled over all | spotted rust and swelled over all |
| Salt Solution Resistance (dipped in 5% NaCl for 150 days | spotted rust | spotted rust | spotted rust on over all | — | — | — | — |

[1]JIS K-5400
[2]JIS K-2371

As shown in Table 1, the coating composition of the present invention shows superior anticorrosiveness and superior adhesiveness to the metal substrate compared with the compositions of the Comparative Examples.

We claim:

1. A coating composition containing, as essential components,
   (A) a prepolymer of epoxy resin and polyhydroxy phenolic compound selected from the group consisting of
      (i) polynuclear polyhydroxy phenols having adjacent hydroxy groups,
      (ii) polyol esters of polyhydroxy phenolic carboxylic acids having adjacent hydroxy groups, and
      (iii) mixtures of (i) and (ii); and
   (B) an organic hardener for said epoxy resin.

2. A coating composition as claimed in claim 1, wherein said polynuclear polyhydroxy phenol having adjacent hydroxy groups is a condensation product of formaldehyde and polyhydroxy phenol having at least one pair of adjacent hydroxy groups.

3. A coating composition as claimed in claim 1, wherein said polyol esters are aliphatic polyol esters.

4. A coating composition as claimed in claim 1, wherein said prepolymer is obtained by reacting said epoxy resin and said polyhydroxy phenolic compound at a temperature in the range of 100° C. to 200° C.

5. A coating composition as claimed in claim 4, wherein said epoxy resin is reacted with said polyhydroxy phenolic compound in the presence of a solvent and a catalyst selected from the group consisting of tertiary amines, ammonium salts, phosphonium salts, and amine hydrochloride salts.

6. A coating composition as claimed in claim 2, wherein said polyhydroxy phenol is selected from the group consisting of catechol, catechol-3-carboxylic acid or ester thereof, catechol-4-carboxylic acid or ester thereof, pyrogallol, pyrogallol-4,6-dicarboxylic acid or ester thereof, pyrogallol-4-carboxylic acid or ester thereof, gallic acid or ester thereof, tannic acid or ester thereof, and urushiol.

7. A coating composition as claimed in claim 3, wherein said polyol ester of polyhydroxy phenolic carboxylic acid is formed by reacting an aliphatic polyol selected from the group consisting of ethylene glycol, propylene glycol, butylene glycol, 1,6-hexanediol, diethylene glycol, dipropylene glycol, triethylene glycol, tripropylene glycol, glycerin, trimethylol propane, pentaerythritol, sorbitol and glucose with a polyhydroxy phenolic carboxylic acid selected from the group consisting of catechol-3-carboxylic acid, catechol-4-carboxylic acid, gallic acid, m-galloyl gallic acid, pyrogallol-4-carboxylic acid, pyrogallol-4,6-dicarboxylic acid and tannic acid.

8. A coating composition as claimed in claim 1 in which the molar ratio of said epoxy resin to said polyhydroxy phenolic compound is in the range of 1/0.05 to 1/0.1.

* * * * *